(12) United States Patent
Axelsson et al.

(10) Patent No.: US 8,813,925 B2
(45) Date of Patent: Aug. 26, 2014

(54) HYDROPNEUMATIC SUSPENSION UNIT

(75) Inventors: Jakob Axelsson, Linköping (SE); Leif Lundahl, Värends Nöbbele (SE)

(73) Assignee: Stromsholmen AB, Tranas (SE)

( * ) Notice: Subject to any disclaimer, the term of this patent is extended or adjusted under 35 U.S.C. 154(b) by 312 days.

(21) Appl. No.: 12/475,930

(22) Filed: Jun. 1, 2009

(65) Prior Publication Data
US 2009/0309278 A1 Dec. 17, 2009

Related U.S. Application Data
(60) Provisional application No. 61/061,238, filed on Jun. 13, 2008.

(30) Foreign Application Priority Data

Jun. 13, 2008 (SE) ...................................... 0801391

(51) Int. Cl.
| | |
|---|---|
| F16F 9/34 | (2006.01) |
| F16F 9/32 | (2006.01) |
| F16F 9/06 | (2006.01) |
| F16F 9/24 | (2006.01) |

(52) U.S. Cl.
CPC .............. F16F 9/063 (2013.01); F16F 9/3214 (2013.01); F16F 9/3405 (2013.01)
USPC ....... 188/322.13; 188/313; 188/316; 188/269

(58) Field of Classification Search
USPC ....................... 188/297, 322.13, 322.12, 269, 188/313–316; 267/64.11, 64.12, 64.15; 280/124.158
See application file for complete search history.

(56) References Cited

U.S. PATENT DOCUMENTS

| | | | | | |
|---|---|---|---|---|---|
| 847,841 | A | * | 3/1907 | Hayward | 294/104 |
| 2,039,135 | A | * | 4/1936 | Reed et al. | 267/64.11 |
| 3,164,381 | A | * | 1/1965 | Tuczek | 267/64.15 |
| 3,647,239 | A | * | 3/1972 | Katsumori | 280/124.154 |
| 3,661,236 | A | * | 5/1972 | Wossner | 188/315 |
| 3,865,356 | A | * | 2/1975 | Wossner | 267/139 |
| 3,880,446 | A | * | 4/1975 | Muller | 280/124.158 |
| 3,957,259 | A | * | 5/1976 | Peddinghaus | 267/64.15 |
| 2004/0232606 | A1 | * | 11/2004 | Timoney et al. | 267/64.26 |
| 2011/0115140 | A1 | * | 5/2011 | Moulik et al. | 267/64.23 |

FOREIGN PATENT DOCUMENTS

| | | |
|---|---|---|
| DE | 3319695 | 6/1984 |
| DE | 3319695 | 12/1984 |
| GB | 332183 | 7/1930 |
| GB | 696206 | 8/1953 |
| GB | 1332183 | 10/1973 |
| SE | 444541 | 4/1986 |

OTHER PUBLICATIONS

International Search Report & Written Opinion dated Aug. 19, 2009.

* cited by examiner

*Primary Examiner* — Melody Burch
(74) *Attorney, Agent, or Firm* — Fay Sharpe LLP

(57) ABSTRACT

A hydropneumatic suspension unit for a vehicle that includes an outer sleeve which defines a first chamber, and a damping piston which is arranged for sliding displacement in the first chamber. The first chamber contains gas mainly for providing spring action and liquid mainly for providing damping action. The gas is in direct contact with the liquid.

12 Claims, 6 Drawing Sheets

HYDROPNEUMATIC SUSPENSION UNIT

The present invention claims priority on Swedish Patent Application Serial No. 0801391-4 filed Jun. 13, 2008 and U.S. Provisional Patent Application Ser. No. 61/061,238 filed Jun. 13, 2008, both of which are fully incorporated herein by reference.

TECHNICAL FIELD

The present invention relates to a hydropneumatic suspension unit, and more particularly to a hydropneumatic suspension unit for use in vehicles.

BACKGROUND OF THE INVENTION

Many vehicles nowadays have some form of suspension system. A complete suspension system usually comprises a spring and a damper. The spring may be a steel helical spring and a damper may be disposed inside the spring. The total force in the spring leg is given by the sum of the force from the spring and the force from the damper. The spring force is determined by the position of the spring leg and the damping force is given by the speed of the spring leg. This principle is currently applied to most types of wheeled vehicles, such as passenger cars and heavy-duty vehicles.

For heavy-duty vehicles, gas-hydraulic (hydropneumatic) suspension is used in certain cases. A suspension system of hydropneumatic type often comprises a hydraulic cylinder, filled with hydraulic liquid, which is connected to an accumulator, which has two chambers separated by a piston. One of the chambers, on one side of the piston, contains hydraulic liquid, and the other chamber, on the other side, contains a pneumatic pressure medium, which constitutes the actual spring element. Damping valves are arranged along the flow path of the hydraulic liquid between the hydraulic cylinder and the accumulator, the function of said damping valves being to create a flow resistance when the hydraulic liquid is forced to flow through the damping valves. In this way, a damping action is exerted on the spring motion of the vehicle. In this case, the accumulator may be provided with a separating piston between the hydraulic fluid, which is essentially incompressible, and the pneumatic medium, which is compressible.

These prior art suspension units have resulted in increased comfort, better driving characteristics, less vibration, reduced effect upon the chassis and increased productivity, especially when the vehicle has been heavily loaded.

Another common solution in the field of vehicle suspension is the use of bellows cylinders. These have a simpler design and are often driven pneumatically, but they may also be driven by other fluids and mechanical springs. In the case heavily loaded heavy-duty vehicles, bellows cylinders are not appropriate, since they are not capable of cushioning the load in an optimal manner. This has the effect that the dynamic behavior of the vehicle is restricted, thus affecting the drivability of the vehicle.

The newer types of suspension systems have not been entirely beneficial. As a result of progress, the suspension systems have become increasingly complex with more electronic components being built into the solutions, with the result that the systems have become more expensive. Also the weight of the suspension systems has increased as a result of all the added functionality. Consequently, the environmental impact of the vehicle increases in the form of increased emissions and costs.

In order to satisfy future requirements for environmental compatibility while maintaining performance unchanged, there is a need for suspension systems which are more compact and lighter, but which offer the suspension properties needed to ensure improved comfort and better driving dynamics for heavy-duty vehicles.

Swedish Patent SE 444 541 discloses a hydropneumatic suspension system, which comprises an outer and an inner cylinder, which initially has two well-defined chambers prepressurized by means of different mediums (e.g, oil and gas, respectively, etc.). During a given displacement of the suspension system, a globe valve is opened, whereupon the pressure in the two chambers is equalized for the purpose of changing the suspension curve.

In view of the current state of suspension systems, there is a need for suspension systems which permit the setting of spring characteristics and road clearance and which are simple and robust and can be manufactured at a lower cost.

SUMMARY OF THE INVENTION

A general object is to provide a suspension system which entirely or in part obviates the drawbacks of prior art suspension systems.

According to a first non-limiting aspect of the invention, a hydropneumatic suspension unit for a vehicle is provided, comprising an outer sleeve, and a damping piston, which is arranged for sliding displacement in the outer sleeve. The outer sleeve contains gas mainly for providing spring action and liquid mainly for providing damping action, the gas being in direct contact with the liquid.

By having liquid and gas act in the same space, without any separating piston or membrane, a compact suspension unit can be achieved. In such a suspension unit, the damping characteristics can be controlled by valves and by the amount of liquid and the gas pressure inside the given volume of the chamber.

During the damping action, both gas and liquid, possibly in emulsion form, can be simultaneously pressed past the damping piston, through the damping piston or a damping valve arranged therein and/or between the damping piston and an inner surface of the first chamber. Alternatively, only liquid can be pressed past the damping piston for providing the damping action.

The suspension unit can further comprise an inner sleeve, which is arranged for sliding displacement in the outer sleeve, the damping piston being fixed relative to the inner sleeve.

A first chamber can be defined by an inner surface of the outer sleeve and the damping piston, and a second chamber can be defined by an inner surface of the inner sleeve and the damping piston, and wherein the first and second chambers are in fluid communication with each other, the fluid communication is restricted by the damping piston.

The suspension unit can further comprise a guide part for guiding the relative movement of the inner sleeve and the outer sleeve.

A third chamber can be defined by the inner surface of the outer sleeve, an outer surface of the inner sleeve, the guide part and the damping piston.

The third chamber may be in fluid communication with the first and/or the second chamber, the fluid communication being restricted by the damping piston and/or a damping channel. Such a damping channel can be provided with a damping valve.

The suspension unit can further comprise a first extreme position damper for damping a compressed extreme position.

The first extreme position damper can be operative between the guide part and a flange extending radially from the inner sleeve.

The first extreme position damper can be operative directly or indirectly between the outer sleeve and the damping piston.

The first extreme position damper can comprise an elastic element or a throttling of a flow area.

The suspension unit can further comprise a second extreme position damper for damping an extended extreme position.

The second extreme position damper can be operative directly or indirectly between the outer sleeve and the damping piston.

The second extreme position damper can comprise an elastic element or a throttling of a flow area.

According to a second non-limiting aspect of the invention, a suspension system for a vehicle is provided, comprising a hydropneumatic suspension unit according to any one of the embodiments described above, which is in pneumatic and/or hydraulic connection with at least one system accumulator.

The suspension system can further comprise a gas throttling valve arranged to restrict the pneumatic connection between the hydropneumatic suspension unit and the system accumulator, such that only a limited mass flow, which is greater than zero, is allowed in the pneumatic connection.

In summary, the invention pertains to a new and improved hydropneumatic suspension unit. In one non-limiting embodiment of the invention, the hydropneumatic suspension unit is designed for use in a vehicle; however, this is not required. The hydropneumatic suspension unit typically includes an outer sleeve and a damping piston that is arranged for sliding displacement in the outer sleeve. There is typically provided a space in the outer sleeve that contains two different types of fluid, typically a gas and liquid. The gas in the outer sleeve is typically used to provide a spring action. The liquid in the outer sleeve is typically used to provide damping action. The gas in the outer sleeve can be in direct contact with the liquid; however, this is not required. As can be appreciated, all or a portion of the gas can be used to provide a damping action, and/or all or a portion of the liquid can be used to provide a spring action; however, this is not required. The hydropneumatic suspension unit can include an inner sleeve which is arranged for sliding displacement in the outer sleeve; however, this is not required. The damping piston can be fixed relative to the inner sleeve; however, this is not required. The hydropneumatic suspension unit typically includes a first chamber that is defined by an inner surface of the outer sleeve and the damping piston, and a second chamber that is defined by an inner surface of the inner sleeve and the damping piston; however, this is not required. The first and second chambers are typically in fluid communication with each other, and the fluid communication between the two chambers is partially or fully restricted by the damping piston; however, this is not required. The hydropneumatic suspension unit can include at least one adjustable damping valve that is at least partially arranged in the damping piston; however, this is not required. The adjustable damping valve can be used to at least partially restrict fluid communication between the first and second chambers; however, this is not required. The hydropneumatic suspension unit can include a guide part to at least partially guide the relative movement of the inner sleeve and the outer sleeve; however, this is not required. The hydropneumatic suspension unit can include a third chamber that is defined by the inner surface of the outer sleeve, an outer surface of the inner sleeve, the guide part and the damping piston; however, this is not required. The third chamber can be in fluid communication with the first and/or the second chambers; however, this is not required. When the third chamber is in fluid communication with the first and/or the second chambers, such fluid communication can be partially or fully restricted by the damping piston and/or a damping channel; however, this is not required. The hydropneumatic suspension unit can include a first extreme position damper for damping a compressed extreme position; however, this is not required. The first extreme position damper can be operative between the guide part and a flange extending radially from the inner sleeve; however, this is not required. The first extreme position damper, when used, can be operative directly or indirectly between the outer sleeve and the damping piston; however, this is not required. The first extreme position damper can include an elastic element and/a throttling of a flow area; however, this is not required. The hydropneumatic suspension unit can include a second extreme position damper for damping an extended extreme position; however, this is not required. The second extreme position damper, when used, can be operative directly or indirectly between the outer sleeve and the damping piston; however, this is not required. The second extreme position damper can include an elastic element and/or a throttling of a flow area; however, this is not required. The hydropneumatic suspension unit can form a part of a suspension system of a vehicle; however, this is not required. The hydropneumatic suspension unit forms a part of the suspension system of a vehicle, the hydropneumatic suspension unit can be designed to be in pneumatic and/or hydraulic connection with at least one system accumulator; however, this is not required. The suspension system can include a gas throttle valve that is arranged to restrict the pneumatic connection between the hydropneumatic suspension unit and the system accumulator such that only a limited mass flow, which is greater than zero, is allowed in the pneumatic connection; however, this is not required.

These and other objects and advantages will become apparent from the following description taken together with the accompanying drawings.

BRIEF DESCRIPTION OF THE DRAWINGS

Reference may now be made to the drawings, which illustrate several non-limiting embodiments that the invention may take in physical form and in certain parts and arrangements of parts wherein.

DESCRIPTION OF NON-LIMITING EMBODIMENTS

Figure 1:
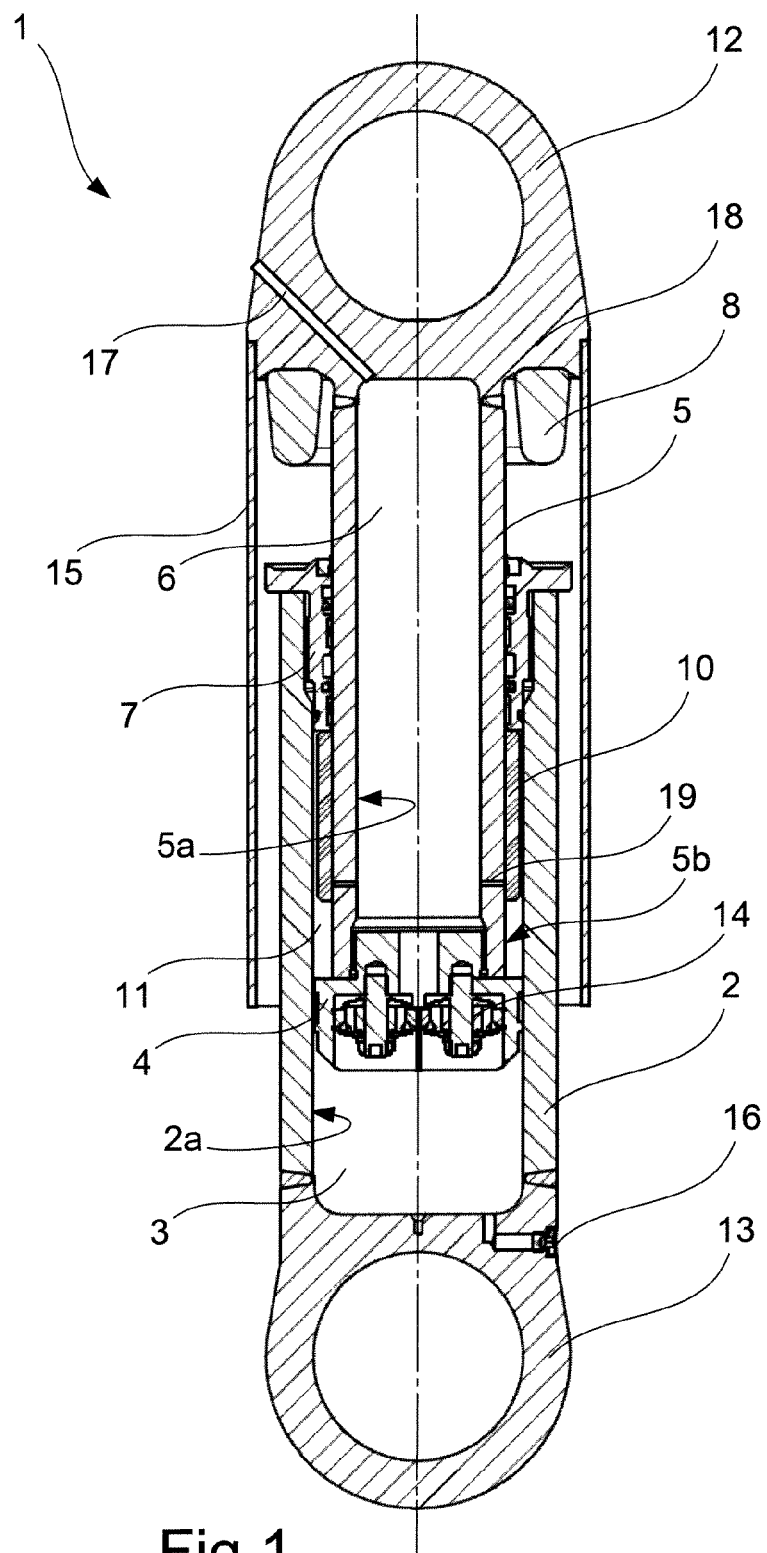
FIG. 1 is a schematic sectional view of a spring leg according to one non-limiting embodiment.
Figure 2:
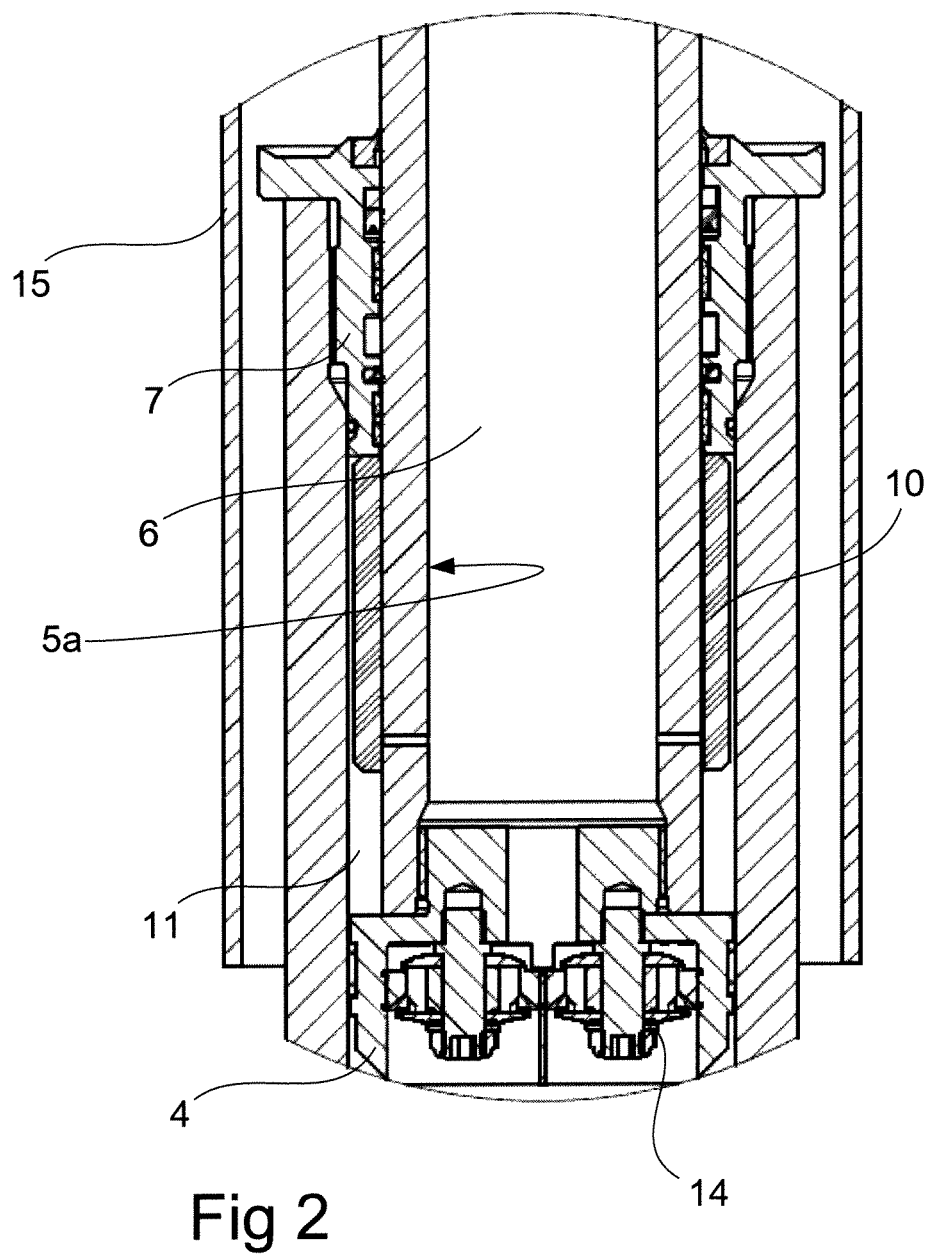
FIG. 2 is a partial enlargement of the damping piston and the guide part in FIG. 1.

Referring now to the drawings wherein the showings are for the purpose of illustrating non-limiting embodiments of the invention only and not for the purpose of limiting same, FIGS. 1 and 2 show a suspension unit, which is made up of an outer sleeve 2, in which an inner sleeve 5 is slidably arranged. The outer sleeve 2 has an open end, which is provided with a guide part 7 for guiding the movement of the inner sleeve 5 and for sealing, and a closed end, on which a mounting ring 13 is arranged. The inner sleeve 5 has a first end, at which a damping piston 4 is arranged, generally fixedly arranged, and a second, closed end, at which a mounting lug 12 is arranged.

The damping piston 4 is designed to perform a sliding movement in the outer sleeve 2 while gas and liquid present in the outer sleeve is being pressed through and/or past the damping piston 4. The damping piston 4 can be provided with one or more damping valves 14, which may be adjustable for providing the desired flow. When more than one damper valve is used, the valves can be arranged such that the damping can be different depending on the direction in which the damping piston 4 is traveling. Moreover, the damping piston can be designed to allow a small flow between the damping piston 4 and the inner surface 2a of the outer sleeve.

The closed end of the outer sleeve 2 and the damping piston together define a first chamber 3. A second chamber 6 is defined by the damping piston and the inner surface 5a of the inner sleeve 5.

A third chamber 11 can be defined by the damping piston, the outer surface 5b of the inner sleeve, the inner surface 2a of the outer sleeve 2 and the guide part 7.

The first chamber 3 can be in communication with the third chamber through a flow between the damping piston and the inner surface 2a of the outer sleeve.

The second chamber 6 can be in communication with the third chamber through one or more damping channels 19.

An extreme position damper 8 for providing damping action when the suspension unit is in the compressed extreme position can be arranged on a radially extending flange 18 at the closed end of the inner sleeve 5. This extreme position damper 8 can be arranged to be axially operative directly or indirectly between the flange 18 and the outer sleeve 2. The extreme position damper 8 may, for example, be arranged to be operative between the flange 18 and the guide part 7. Such an extreme position damper 8 may be in the form of one or more elements of rubber or rubber-like material.

Yet another extreme position damper 10 for providing damping action when the suspension unit 1 is in the extended extreme position can be arranged to be axially operative between the guide part 7 and the damping piston 4. Such an extreme position damper 10 may be provided in the form of one or more elements of rubber or rubber-like material, for example polyurethane.

Furthermore, the suspension unit 1 can be provided with one or more filling ports 16, 17. According to one non-limiting embodiment, a filling port 16 is used for gas filling as well as liquid filling. According to another non-limiting embodiment, the filling port 16 may be used, for example, for filling a liquid and the filling port 17 may be used for filling a gas.

The filling ports 16, 17 can be designed to be connected to the appropriate filling or adjusting equipment. One or both of the filling ports 16, 17 may be connected to a system for adjusting the characteristics of the suspension unit.

The suspension unit 1 is designed such that liquid (e.g. oil) and gas (e.g. nitrogen gas) are integrated in the same space (chamber 3, 6, 11) without being sealed off from each other. In this way, a much more compact solution is obtained and the damping characteristics of the suspension unit can be easily controlled by choosing the amount of oil and the gas pressure inside the chambers 3, 6, 11 and by means of the damping valves 14. Thus, the damping valves 14 will operate in an emulsion of hydraulic liquid and pneumatic media and will be positioned such that a spring motion creates a flow through the valves 14.

According to one non-limiting embodiment, the amount of liquid can be such that the damping valves 14 mainly operate in the liquid.

The suspension characteristics are controlled by the amount of liquid in the given volume, which thus determines the pressure build-up (spring stiffness) of the spring leg. The gas pressure is determined by the load to be damped. Depending on the load range, the pressure inside the spring leg may vary from 0 bar up to 400 bar.

Figure 3:
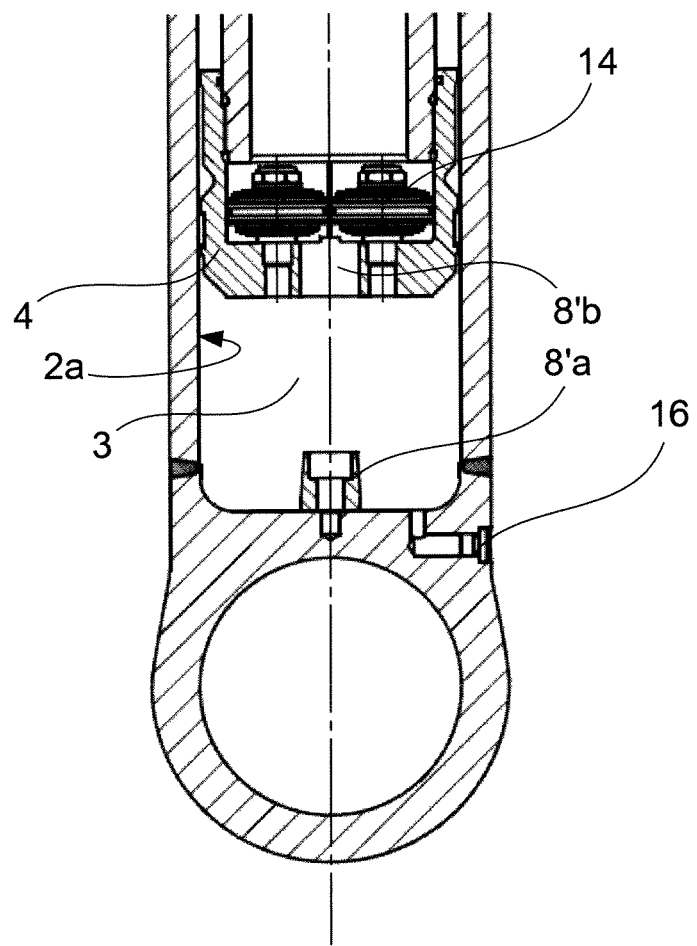
FIG. 3 is a schematic sectional view of an alternative extreme position damper for extreme position damping during compression.

An alternative solution to the extreme position damping for the compressed extreme position is shown in FIG. 3 and consist of a cone 8'a, which is mounted in the closed end of the outer sleeve 2 and adapted to engage with a hole 8'b in the damping piston 4, which is mounted in one end of the inner sleeve 5. During compression of the suspension unit, caused by the initiation of a spring motion, the damper piston 4 moves towards the cone 8'a, where the two finally engage and extreme position damping occurs. The extreme position damping may occur in a continuous manner, in which the throttling area is gradually reduced as the cone 8'a moves into the hole 8'b of the damping piston.

Figure 4:
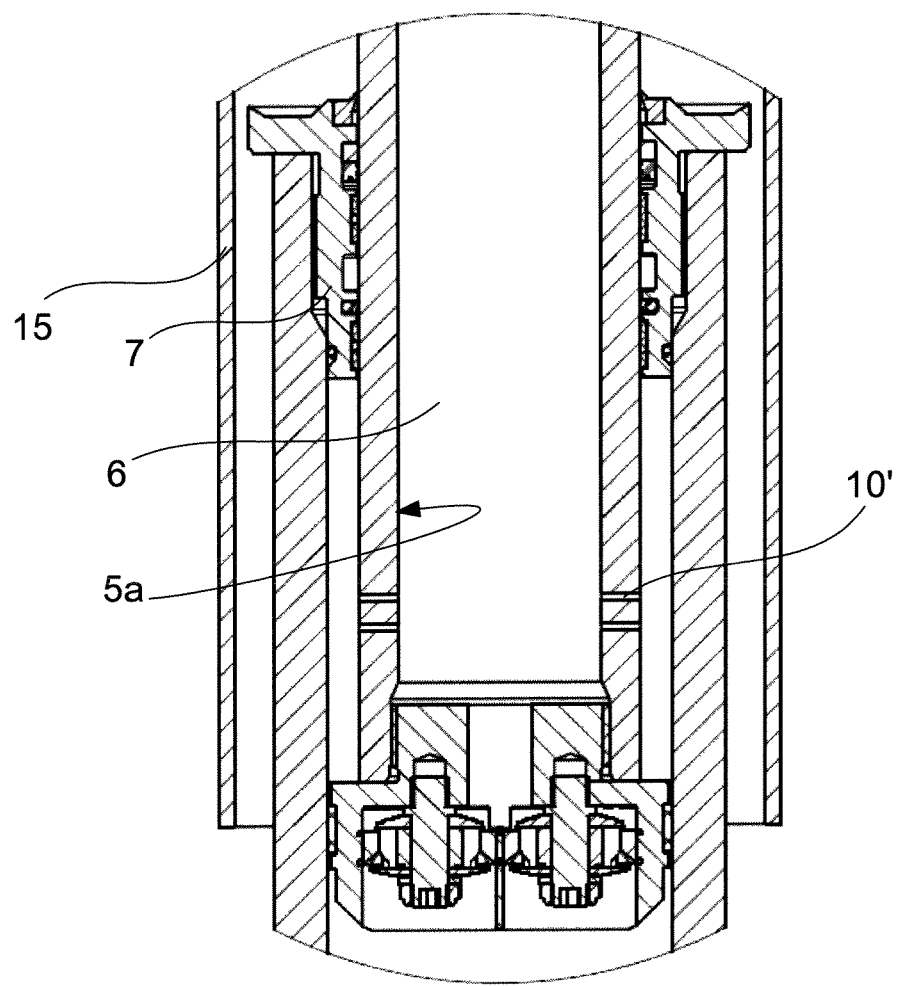
FIG. 4 is a schematic sectional view of an alternative extreme position damper for extreme position damping during extension.

In the other direction, as illustrated in FIG. 4, the extreme position damping may be provided in the form of radial damping holes 10' in the inner sleeve 5. As the suspension unit 1 travels towards its fully extended position, the outer sleeve 2 and the inner sleeve 5 move away from each other. When the damping holes 10' move into the guide part 7, which causes them to close, the throttling area is reduced so as to match the current piston rod speed, thereby avoiding pressure spikes in the suspension unit 1.

The extreme position damping is not limited to the solutions described above, but may be conceived in other ways. It may, for example, be provided on the outside of the sleeve in the form of one or more polyurethane elements, in order to save space. Another solution may be to integrate the extreme position damping into the piston rod protection 15.

Figure 5:
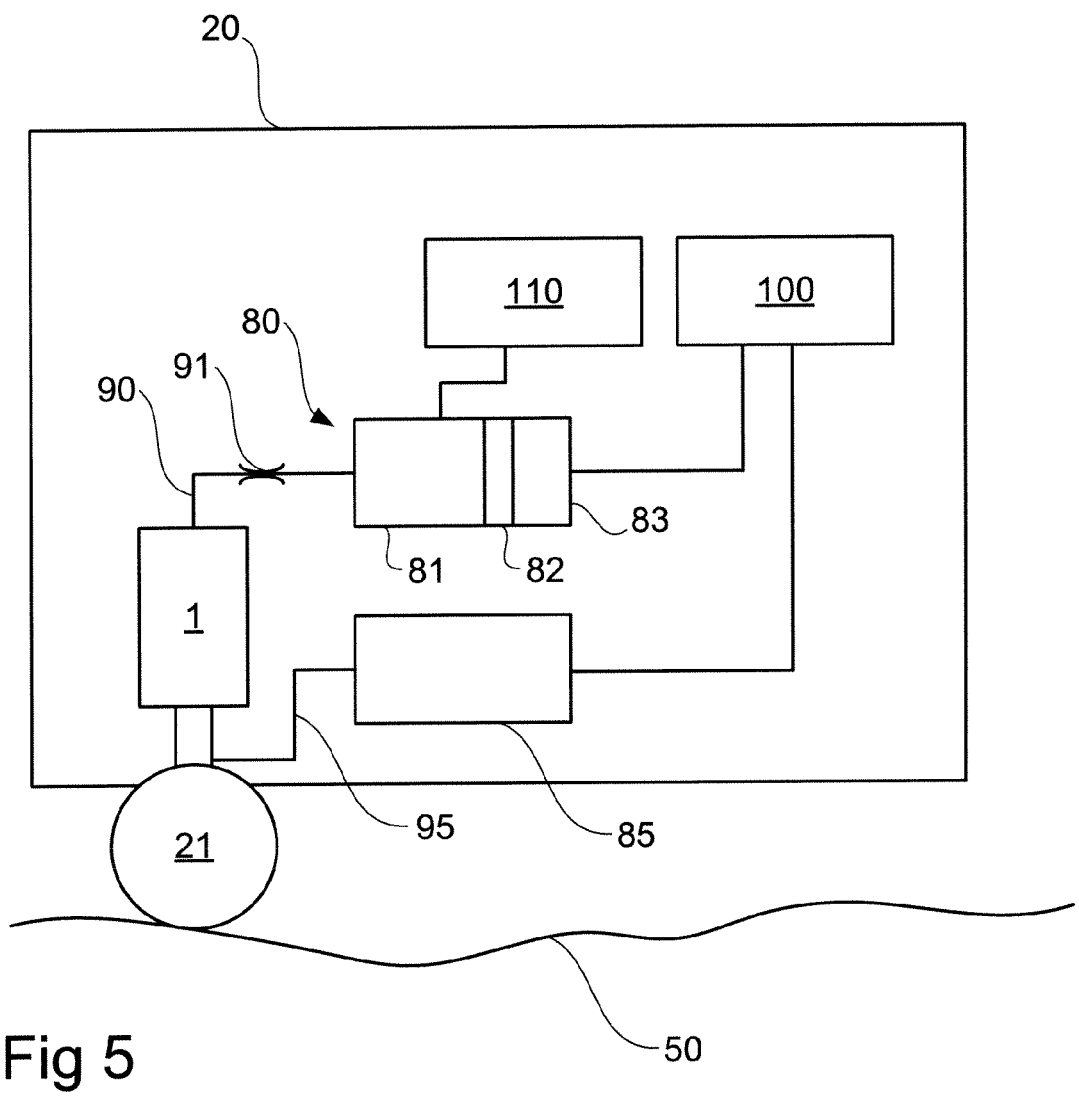
FIG. 5 is a schematic view of a non-limiting suspension system.

With reference now to FIG. 5, a suspension system will be described which may comprise the suspension device discussed above.

FIG. 5 shows a suspension system which is arranged to act between a wheel 21 or the like bearing against a ground surface, for example a roadway 50, and a vehicle 20. The suspension system comprises a hydropneumatic suspension unit 1, as described above, which acts between the wheel 21 and the vehicle 20.

The suspension unit is in turn connected to at least one system accumulator 80, 85 via a pneumatic connection 90 and/or a hydraulic connection 95. The system accumulator 80, 85 can be connected to a hydraulic system 100 of the vehicle, or to a compressor 110.

The system accumulator 80 can comprise a system gas chamber 81 and a system hydraulic chamber 83. The system hydraulic chamber 83 and the system gas chamber 81 can be separated by a piston 82, a membrane or the like. The system accumulator 80 can be connected to one, two or more suspension systems.

The system hydraulic chamber 83 can be connected to a hydraulic system 100 associated with the vehicle.

According to an alternative non-limiting embodiment, the system gas chamber 81 can be connected to a compressor 110 associated with the vehicle. In this non-limiting embodiment, the system accumulator 80 need not comprise any system hydraulic chamber 83 or piston 82.

A gas throttle valve 91 usually has an effective valve area which is less than the area of the pneumatic connection 90.

According to one non-limiting embodiment, the gas throttle valve 91 can be a fixed valve, which is arranged to allow a predetermined flow which is greater than zero. According to one non-limiting embodiment, the gas throttle valve 91 is chosen such that it allows as little flow as possible, given a certain desired level-regulation speed. Where a fixed gas throttle valve is used, this can be chosen for each given application, for example vehicle type.

According to an alternative non-limiting embodiment, the gas throttle valve 91 can be an adjustable valve, which is arranged to allow at least two different flows, which both are greater than zero. An adjustable valve of this kind may be adjustable, insofar as it is set in a position and then remains in this position during use of the system. Alternatively, an adjustable valve of this kind may be adjustable even during use of the system, for example, in response to some external factor, or some vehicle behavior requirement. However, in order for the throttle valve 91 to be adjustable in this way, both a more advanced throttle valve and a control system are required, which adds to the complexity of the system as a whole.

The pneumatic connection 90 may be connected to the first 3, second 6 or third 11 chamber of the system.

The system shown in FIG. 5 works such that a movement of the wheel, caused, for instance, by an unevenness in the ground surface, gives rise to a relative movement between the inner sleeve 5 and the outer sleeve 2, hydraulic liquid and gas enclosed in the first and second chambers 3, 6 being displaced through the damping valves 14 and/or the space surrounding the damping piston 4 with a view to providing a damping action. At the same time the pressure increase in the first and second chambers 3, 6 results in the gas enclosed therein being compressed, thereby providing the spring action.

Figure 6:
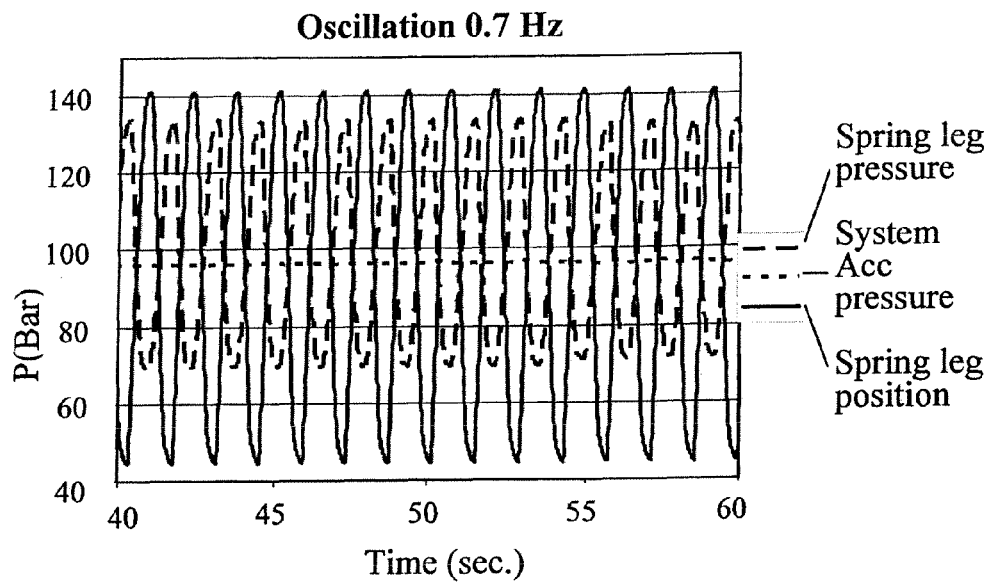
FIG. 6 illustrates a first test result for the suspension system in FIG. 5; and, FIG. 7 illustrates a second test result for the suspension system in FIG. 5.

From FIG. 6 it can be seen that the pressure in the suspension unit 1 varies strongly in response to a change of position of the spring leg. Despite the fact that the connection 90 between the chambers 3, 6 and the system gas chamber 81 is open, very little mass flow takes place, however, between the chambers 3, 6 and the system gas chamber 81, with the result that the pressure in the system gas chamber is changed very little.

Figure 7:
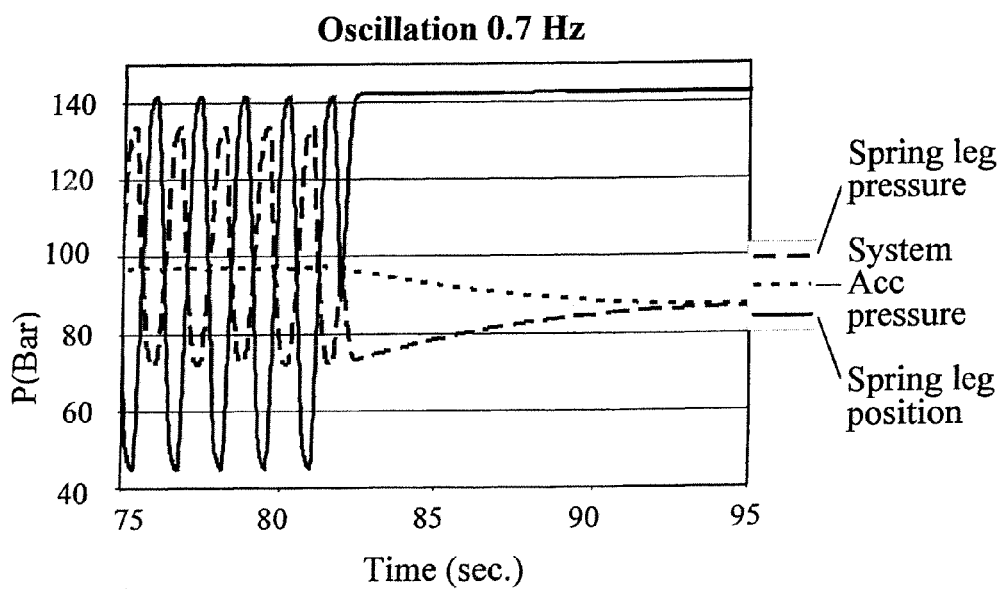

From FIG. 7 it can be seen that if the piston is stopped in, for example, the extended position, it takes approximately 20 seconds before the pressure is equalized between the chambers 3, 6 and the system gas chamber 81.

Level regulation, i.e. regulation of the ground clearance of the vehicle, may be achieved by increasing the pressure in the system gas chamber 81, or by supplying hydraulic liquid or gas to the first or the second chamber.

Adjustment of the spring stiffness of the spring leg may be achieved by increasing the pressure in the system gas chamber 81.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:

1. A hydropneumatic suspension unit for a vehicle comprising:
    an outer sleeve, said outer sleeve including an inner side wall, an outer side wall, a base and a top opening;
    an inner sleeve, said inner sleeve including an inner side wall, an outer side wall, a top and a base opening, said inner sleeve arranged for sliding displacement in said outer sleeve;
    a damping piston arranged for sliding displacement in said outer sleeve, said damping piston connected to said base opening of said inner sleeve, said damping piston fixed relative to said inner sleeve;
    at least one damping valve at least partially positioned in said damping piston;
    a first chamber, said first chamber at least partially defined by an inner surface of said outer sleeve and said damping piston, said first chamber including a gas and a fluid, said gas primarily designed to provide a spring action and said liquid primarily designed to provide a damping action, said gas being in direct contact with said liquid in said first chamber;
    a second chamber at least partially defined by an inner surface of said inner sleeve and said damping piston, said second chamber including said gas and said liquid, fluid flow of said liquid and said gas between said first and second chambers is at least partially restricted by said at least one damping valve in said damping piston, said damping piston designed to allow liquid, gas and a liquid and gas mixture to flow through said damping piston; and,
    a third chamber that is at least partially defined by said inner surface of said outer sleeve, an outer surface of said inner sleeve, a guide part secured to said outer sleeve, and said damping piston, said third chamber including said gas and said fluid, said third chamber in fluid communication with said first chamber via a fluid passage between an outer surface of said damping piston and said inner surface of said outer sleeve, said third chamber in fluid communication with said second chamber via a non-valve containing damping channel, said guide part designed to guide a relative movement of said inner sleeve and said outer sleeve during movement of said damping piston.

2. The hydropneumatic suspension unit as defined in claim 1, said non-valve containing damping channel designed to be blocked and unblocked to fluid flow through said non-valve containing damping channel based on a position of said damping piston.

3. The hydropneumatic suspension unit as defined in claim 1, including a first extreme position damper designed for at least partially damping a compressed extreme position, said first extreme position damper formed of an elastic element, said first extreme position damper is operative between said guide part and a flange extending radially from the inner sleeve.

4. The hydropneumatic suspension unit as defined in claim 2, including a first extreme position damper designed for at least partially damping a compressed extreme position, said first extreme position damper formed of an elastic element, said first extreme position damper is operative between said guide part and a flange extending radially from the inner sleeve.

5. The hydropneumatic suspension unit as defined in claim 3, including a second extreme position damper for damping an extended extreme position, said second extreme position damper is operative between an inner surface of said outer sleeve and said damping piston, second extreme position damper includes an elastic element.

6. The hydropneumatic suspension unit as defined in claim 4, including a second extreme position damper for damping an extended extreme position, said second extreme position damper is operative between an inner surface of said outer sleeve and said damping piston, second extreme position damper includes an elastic element.

7. The hydropneumatic suspension unit as defined in claim 1, including filling port arrangement to add fluid to said hydropneumatic suspension unit via at least one of said first and second chambers, said filling port arrangement including one or more arrangements selected from the group consisting of a) a first port in fluid communication with said first chamber and as second port in fluid communication with said second chamber.

8. The hydropneumatic suspension unit as defined in claim 6, including filling port arrangement to add fluid to said hydropneumatic suspension unit via at least one of said first and second chambers, said filling port arrangement including one or more arrangements selected from the group consisting of a) a first port in fluid communication with said first chamber and as second port in fluid communication with said second chamber.

9. The hydropneumatic suspension unit as defined in claim 1, wherein said hydropneumatic suspension unit forms at least a portion of a suspension system for a vehicle, said hydropneumatic suspension unit in pneumatic connection, hydraulic connection, or combinations thereof with at least one system accumulator.

10. The hydropneumatic suspension unit as defined in claim 8, wherein said hydropneumatic suspension unit forms at least a portion of a suspension system for a vehicle, said hydropneumatic suspension unit in pneumatic connection, hydraulic connection, or combinations thereof with at least one system accumulator.

11. The hydropneumatic suspension unit as defined in claim 1, including a gas throttle valve designed to at least partially restrict said pneumatic connection between said hydropneumatic suspension unit and said at least one system accumulator so that only a limited mass flow, which is greater than zero, is allowed in said pneumatic connection.

12. The hydropneumatic suspension unit as defined in claim 10, including a gas throttle valve designed to at least partially restrict said pneumatic connection between said hydropneumatic suspension unit and said at least one system accumulator so that only a limited mass flow, which is greater than zero, is allowed in said pneumatic connection.

* * * * *